Sept. 19, 1967  L. N. HAVENER  3,341,909
CLAMP
Filed Sept. 1, 1965
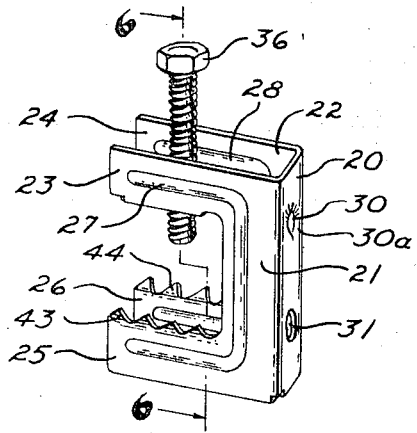
Fig. 1
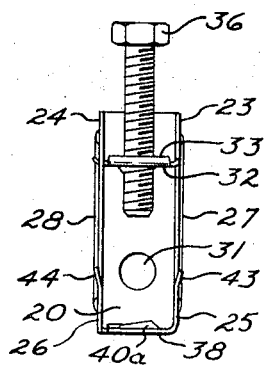
Fig. 2
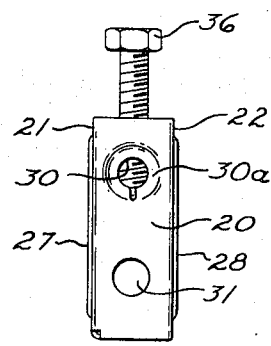
Fig. 3
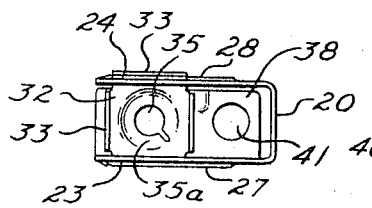
Fig. 4
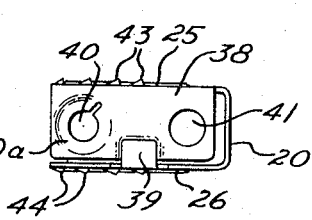
Fig. 5
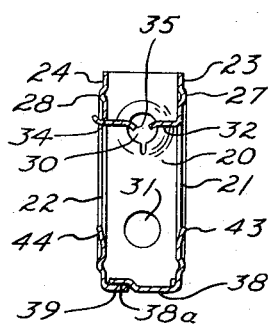
Fig. 6
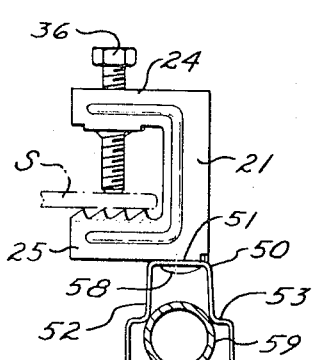
Fig. 7
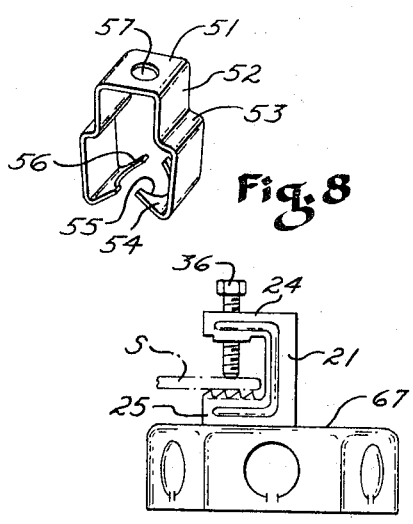
Fig. 8
Fig. 10
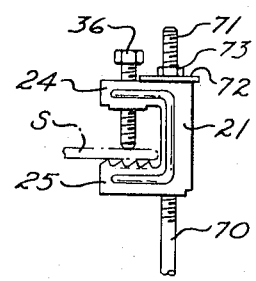
Fig. 11
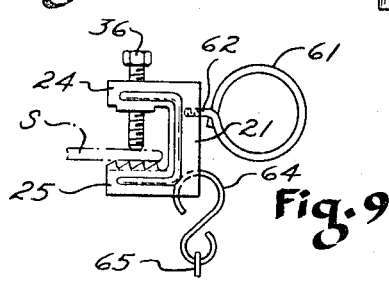
Fig. 9
INVENTOR
Leslie N. Havener
BY
Meyer, Baldwin, Doran & Egan
ATTORNEYS

United States Patent Office 3,341,909
Patented Sept. 19, 1967

3,341,909
CLAMP
Leslie N. Havener, Euclid, Ohio, assignor to Spring Steel
Fasteners, Inc., Cleveland, Ohio, a corporation of Ohio
Filed Sept. 1, 1965, Ser. No. 484,178
4 Claims. (Cl. 24—243)

ABSTRACT OF THE DISCLOSURE

A clamp structure having a U-shaped main body, with the bight of the U being rectangular and the parallel legs of the U each having parallel arm extensions, so that each leg with its corresponding arms defines a C-shaped jaw and the parallel legs define parallel, adjacent, C-shaped jaws.

---

This invention relates to clamps and particularly to a C-clamp adapted for connecting various articles to a support member.

The invention has for its primary object the provision of a clamp of the aforesaid nature which is characterized by its structural simplicity, its inexpensive manufacturing costs, the ease with which it may be formed, and the particularly effective manner in which it performs its function.

More specifically, it is an object of this invention to provide a clamp having various means for receiving both threaded and nonthreaded fastening members.

Still another object is to provide such a clamp which is formed from a single piece of sheet material, such as sheet steel.

Further objects of the present invention and a number of its advantages will be referred to in or will be evident from the following description of one embodiment thereof. In describing the invention, reference will be made to the accompanying drawings.

FIG. 1 of the drawings is a perspective view of the clamp of this invention.

FIG. 2 is a front elevation of the clamp as seen from the left-hand side of FIG. 1.

FIG. 3 is a rear elevation of the clamp as seen from the right-hand side of FIG. 1.

FIG. 4 is a top plan view of the clamp.

FIG. 5 is a bottom plan view of the clamp.

FIG. 6 is a section taken along the line 6—6 of FIG. 1.

FIG. 7 is a side elevation of the clamp in association with a bracket.

FIG. 8 is a perspective view of the bracket of FIG. 7.

FIGS. 9-11 are side elevations of the clamp showing various articles in association therewith.

Before the clamp illustrated is specifically described, it is to be understood that the invention here involved is not limited to the structural details or arrangement of parts shown since clamps embodying the present invention may take various forms. It is also to be understood that the phraseology or terminology herein employed is for the purpose of description and not of limitation since the scope of the present invention is denoted by the appended claims.

Referring now to the drawings, and particularly to FIG. 1, the clamp of this invention as herein illustrated and described is formed from a single stamping of sheet steel and comprises, when in an upright position, an elongated, rectangular rear wall 20 carrying right angularly disposed, forwardly directed, integral side walls 21 and 22 at its longer side edges. The side walls 21 and 22 are provided with parallel, forwardly directed, substantially similar upper arms 23 and 24, respectively, and parallel, forwardly directed, substantially similar lower arms 25 and 26, respectively. The upper arms 23 and 24 are substantially spaced from the lower arms 25 and 26 whereby the clamp is adapted to engage a supporting member such as the flange of a beam or the like. The channel shape defined by the rear and side walls provides a rigid connection between the upper and lower arms, and reinforcing ribs 27 and 28, which extend forwardly into said arms, are provided in the side walls 21 and 22, respectively, to further increase the strength and rigidity of the clamp.

The rear wall 20 is provided with two apertures, an upper aperture 30 and a lower aperture 31. Said upper aperture 30 is defined by a helically formed peripheral edge portion 30a whereby it is adapted to engage the threads of a bolt or other threaded article. The aperture 31, on the other hand, is a plain, circular aperture adapted for receiving a hook or any nonthreaded member small enough to be inserted therein.

As best shown in FIGS. 2, 4, and 6, the upper arm 23 has an extension 32 which is carried at the lower edge of said arm 23 and is bent inwardly at right angles thereto. As well shown in FIG. 4, the extension 32 is rectangular in shape having upwardly turned edge portions 33 at its three disconnected edges. Said extension bridges the upper arms 23 and 24, and the edge portion 33 which is disposed opposite to the arm 23 hooks under the lower edge of the arm 24 and seats within a suitable notch 34 in the lower edge of said arm 24. The extension 32 is centrally apertured at 35, said aperture being provided with a helical edge portion 35a whereby it is adapted to receive a bolt, as shown at 36 in FIGS. 1-3.

The lower arm 25 is provided at its lower edge with an extension 38, as best shown in FIGS. 2, 5 and 6. The extension 38 is rectangular in shape and extends substantially the combined lengths of the side wall 21 and lower arm 25. Said extension 38 is bent inwardly at right angles whereby the edge thereof which is disposed opposite to the lower arm 25 is positioned adjacent to the lower edge of the lower arm 26. Said lower edge of the lower arm 26 carries a small, right angularly inwardly turned lug 39 which projects into a complementary recess 38a formed in the bottom surface of the extension 38. Thus, the extension 38 overlaps the lug 39 and is reinforced by said lug against bending downwardly.

As best shown in FIG. 5, the extension 38 is provided with two apertures 40 and 41. The aperture 40 is defined by a helically formed edge portion 40a adapted to receive a bolt or other threaded article whereas the aperture 41 is a plain, circular opening.

The upper edges of the lower arms 25 and 26 are provided with upwardly and obliquely laterally outwardly projecting teeth 43 and 44, respectively, which, as herein illustrated, project outwardly from the planes of the side walls 21 and 22, respectively, at an angle of approximately 15°.

In use of the clamp of this invention, the teeth 43 and 44 are adapted to engage one side of a support member S (FIGS. 7, 9-11) while the bolt 36 engages the opposite side of said support member. Said teeth may engage either the lower surface of the support member S, as illustrated in FIG. 7, or they may engage the upper surface of said support member with the bolt 36 engaging the lower surface thereof. The teeth 43 and 44 tend to bite firmly into said support member when the bolt 36 is tightened thereby effectively and solidly gripping said support member. The outward angling of said teeth adds to the lateral stability of the clamp by widening its gripping surface. It will be noted that the arrangement of the extension 32 which carries the bolt 36 is such that upon tightening said bolt, said extension 32 is forced upwardly with the edge portion thereof which is hooked under the upper arm 24 bearing upwardly against said upper arm 24. This prevents upward bending of the extension 32 when the bolt 36 is tightened.

FIGS. 7 and 9 through 11 illustrate uses of the clamp of this invention for hanging or connecting articles to the support member S. FIG. 7 shows the clamp having a bracket 50 attached thereto, said bracket being shown in greater detail in FIG. 8. Said bracket is generally inverted U-shape and is formed from flat sheet spring steel material. The bracket 50 has a flat web 51 and depending flanges 52 which are outwardly stepped or offset as indicated at 53. The lower edges of the flanges 52 are turned inwardly and angled upwardly to provide gripping portions 54. Each gripping portion 54 has a semicircular cut-out 55 in the distal edge thereof thereby providing a pair of inwardly and obliquely upwardly directed prongs 56.

The web 51 is centrally apertured at 57 to provide means for attaching the bracket 50 to the clamp of this invention. As illustrated in FIG. 7, the bracket 50 is secured to the clamp at the aperture 41 of the extension 38 by means of a rivet 58. With this arrangement, the clamp and bracket become a specialized unit especially adapted for carrying a pipe or conduit 59. Said pipe or conduit is passed upwardly between the flanges 52, which spring outwardly to receive said pipe or conduit, until it seats against the steps 53. At this point, the gripping portions 54 close in below or behind the pipe or conduit 59 with the prongs 56 engaging said pipe or conduit to prevent its removal from the bracket 50.

If desired, a bracket 50 may be detachably connected to the clamp at the aperture 40 by means of a bolt or screw. A bracket 50 may be alternatively or additionally detachably connected to the clamp at the aperture 30 if so desired or riveted at the aperture 31.

FIG. 9 shows two articles attached to a clamp of this invention. At 61 there is shown a bridle ring, said bridle ring being provided with a threaded shank 62 by means of which it engages the aperture 30. Obviously, said bridle ring may alternatively be attached in the same manner at the aperture 40. At 64 there is shown a chain hook carrying a chain 65. The hook 64 is attached to the clamp by passing through both the aperture 31 in the rear wall 20 and the aperture 41 in the extension 38.

FIG. 10 shows a clamp carrying an electrical junction box 67 which may be bolted or riveted to said clamp at either the aperture 40 or the aperture 41.

FIG. 11 illustrates the manner in which a clamp of this invention is used for suspending a rod 70 having a threaded upper end portion 71. Said rod projects upwardly through the aperture 41, between the side walls 21 and 22, and projects upwardly above the upper edges of said side walls. A washer 72 is telescoped over the upper end of the rod 70 to seat upon the upper edges of the walls 20, 21, and 22. A nut 73 is carried by said rod above the washer 72, said nut 73 providing for vertical adjustability of the rod 70 and retaining said rod in any adjusted position.

It will be understood that the examples of the uses to which the clamp of this invention may be put, as herein illustrated and described, are not exhaustive but are merely illustrative. It will also be understood that many changes in the details of the clamp as herein described and illustrated may be made without, however, departing from the spirit thereof or the scope of the appended claims.

What is claimed is:

1. A generally H-shaped sheet metal stamping bent symmetrically along two axes parallel to the cross bar of the H, forming a clamp structure comprising a U-shaped main body, the U-shape being defined by an elongated, rectangular bight portion and integral, parallel legs extending from the longer sides of, and substantially at right angles to, said rectangular bight portion, each said leg having integrally formed therewith a pair of generally parallel arms extending perpendicularly away from said rectangular bight portion in the same direction as said leg, each said leg and its corresponding arms defining a C-shaped jaw, and said parallel legs and corresponding arms defining adjacent parallel C-shaped jaws.

2. A clamp structure comprising a U-shaped main body, the U-shape being defined by an elongated, rectangular bight portion (20) and integral, parallel legs (21, 23) extending from the longer sides of, and substantially at right angles to, said rectangular bight portion; each said leg having integrally formed therewith a pair of generally parallel arms (23, 25 and 24, 26) extending perpendicularly away from said rectangular bight portion in the same direction as said leg; each said leg and its corresponding arms defining a C-shaped jaw, and said parallel legs and corresponding arms defining adjacent, parallel C-shaped jaws comprising an extension (32) integral with an inner edge of one arm of a C-shaped jaw, directed generally at right angles to said arm and toward the adjacent arm of the parallel C-shaped jaw, and an extension (38) integral with an outer edge of another arm of a C-shaped jaw, directed generally at right angles toward the adjacent arm of the parallel C-shaped jaw.

3. The clamp structure as defined in claim 2 wherein said first mentioned extension is provided with a threaded aperture.

4. The clamp structure as defined in claim 2 wherein an inner edge portion of two adjacent arms, of different C-shaped jaws are provided with teeth-like projections.

References Cited

UNITED STATES PATENTS

| 1,233,223 | 7/1917 | Hachmann | 269—249 |
| 1,794,976 | 3/1931 | Mueller | 248—226 X |
| 2,562,562 | 7/1951 | Manasek | 248—228 X |
| 2,676,629 | 4/1954 | Solum | 24—243 |
| 3,185,418 | 5/1965 | Appleton | 248—72 |

FOREIGN PATENTS

| 632,515 | 7/1936 | Germany. |

ROY D. FRAZIER, *Primary Examiner.*

F. DOMOTOR, *Assistant Examiner.*

UNITED STATES PATENT OFFICE
CERTIFICATE OF CORRECTION

Patent No. 3,341,909 September 19, 1967

Leslie N. Havener

It is certified that error appears in the above identified patent and that said Letters Patent are hereby corrected as shown below:

Column 4, line 23, "23" should read -- 22 --; line 31, after "jaws" insert -- means interconnecting the parallel C-shaped jaws --.

Signed and sealed this 21st day of October 1969.

(SEAL)
Attest:

Edward M. Fletcher, Jr.
Attesting Officer

WILLIAM E. SCHUYLER, JR.
Commissioner of Patents